United States Patent
Piesker et al.

(10) Patent No.: US 9,188,374 B2
(45) Date of Patent: Nov. 17, 2015

(54) COOLING SYSTEM AND METHOD FOR OPERATING A COOLING SYSTEM

(75) Inventors: Markus Piesker, Lueneburg (DE); Ahmet Kayihan Kiryaman, Hamburg (DE); Sebastian Roering, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 411 days.

(21) Appl. No.: 13/428,050

(22) Filed: Mar. 23, 2012

(65) Prior Publication Data

US 2013/0074530 A1 Mar. 28, 2013

Related U.S. Application Data

(60) Provisional application No. 61/466,994, filed on Mar. 24, 2011.

(30) Foreign Application Priority Data

Mar. 24, 2011 (DE) .......................... 10 2011 014 955

(51) Int. Cl.
  F25B 41/00 (2006.01)
  F25B 1/00 (2006.01)
  F25B 23/00 (2006.01)

(52) U.S. Cl.
  CPC . *F25B 41/00* (2013.01); *F25B 1/00* (2013.01); *F25B 23/006* (2013.01); *F25B 2600/13* (2013.01); *Y02B 30/745* (2013.01)

(58) Field of Classification Search
  CPC .......... F25B 23/006; F25B 41/00; F25B 1/00; F25B 2600/13; F25B 41/003; F25B 43/006; Y02B 30/745

USPC ........ 62/115, 467, 498, 228.1, 118, 119, 129, 62/513
  See application file for complete search history.

(56) References Cited

U.S. PATENT DOCUMENTS 3,955,375 A * 5/1976 Schumacher ................... 62/217
5,049,223 A * 9/1991 Dais et al. ................ 156/244.11
5,245,833 A * 9/1993 Mei et al. ......................... 62/113
5,598,718 A * 2/1997 Freund et al. ................. 62/238.6

(Continued)

FOREIGN PATENT DOCUMENTS

DE 10 2006 005 035 B3 9/2007
DE 10 2009 011 797 A1 9/2010
WO 2009/058677 A1 5/2009

*Primary Examiner* — Mohammad M Ali
(74) *Attorney, Agent, or Firm* — Carter, DeLuca, Farrell & Schmidt, LLP

(57) ABSTRACT

A cooling system for cooling food on board an aircraft includes a cooling circuit adapted to supply cooling energy to at least one cooling station, a refrigerant circulating in the cooling circuit selected such that it is convertible at least partially from the liquid to the gaseous state of aggregation on releasing its cooling energy to the at least one cooling station and subsequently convertible back at least partially to the liquid state of aggregation again by an appropriate pressure and temperature control in the cooling circuit, and a refrigerant container including a receiving space arranged in an interior space of the refrigerant container which receives the refrigerant circulating in the cooling circuit, the receiving space of the refrigerant container connected to the cooling circuit by a flow line for discharging the refrigerant from the receiving space and by a return line for returning the refrigerant into the receiving space.

14 Claims, 2 Drawing Sheets

(56) References Cited

U.S. PATENT DOCUMENTS

| | | | |
|---|---|---|---|
| 5,622,055 A * | 4/1997 | Mei et al. | 62/113 |
| 6,378,323 B1 * | 4/2002 | Chavagnat | 62/324.4 |
| 6,463,757 B1 * | 10/2002 | Dickson et al. | 62/503 |
| 6,560,978 B2 * | 5/2003 | Renken et al. | 62/132 |
| 6,871,509 B2 * | 3/2005 | Grabon et al. | 62/201 |
| 7,017,353 B2 * | 3/2006 | Gist et al. | 62/73 |
| 7,418,825 B1 * | 9/2008 | Bean, Jr. | 62/259.2 |
| 7,591,302 B1 * | 9/2009 | Lenehan et al. | 165/247 |
| 7,658,079 B2 * | 2/2010 | Bailey et al. | 62/181 |
| 8,651,172 B2 * | 2/2014 | Wyatt et al. | 165/272 |
| 2005/0081545 A1 * | 4/2005 | Gist et al. | 62/217 |
| 2007/0130988 A1 * | 6/2007 | Matsumoto et al. | 62/512 |
| 2009/0000329 A1 * | 1/2009 | Colberg et al. | 62/335 |

* cited by examiner

COOLING SYSTEM AND METHOD FOR OPERATING A COOLING SYSTEM

TECHNICAL FIELD

The invention relates to a cooling system which is designed in particular for operation with a two-phase refrigerant and is suitable for cooling food on board an aircraft. Furthermore, the invention relates to a method for operating such a cooling system

BACKGROUND OF RELATED ART

A cooling system suitable for operation with a two-phase refrigerant is known from DE 10 2006 005 035 B3 and is used for example to cool food which is stored on board a passenger aircraft and intended to be distributed to the passengers. Typically, the food intended for supplying to the passengers is kept in mobile transport containers. These transport containers are filled and precooled outside the aircraft and after loading into the aircraft are placed at appropriate locations in the aircraft passenger cabin, for example in the galleys. In order to guarantee that the food remains fresh up to being distributed to the passengers, in the region of the transport container locations cooling stations are provided, which are supplied with cooling energy from a central refrigerating device and release this cooling energy to the transport containers, in which the food is stored. A cooling system with a central refrigerating device, as opposed to refrigerating units formed separately at the individual transport container locations, has the advantages of a smaller installation volume and a lower weight and moreover entails less outlay for assembly and maintenance. Furthermore, by using a cooling system with a central refrigerating device arranged outside the passenger cabin it is possible to avoid machine noises generated by refrigerating units placed in the region of the transport container locations, which noises are audible in the aircraft passenger cabin and hence may be found to be disturbing.

In the cooling system known from DE 10 2006 005 035 B3, the phase transitions of the refrigerant flowing through the cooling circuit which occur during operation of the system allow the latent heat consumption which then occurs to be utilised for cooling purposes. The refrigerant mass flow needed to provide a desired cooling capacity is therefore markedly lower than for example in a liquid cooling system, in which a one-phase liquid refrigerant is used. Consequently, the cooling system described in DE 10 2006 005 035 B3 may have lower line cross sections than a liquid cooling system with a comparable cooling capacity. What is more, the reduction of the refrigerant mass flow makes it possible to reduce the conveying capacity needed to convey the refrigerant through the cooling circuit of the cooling system. This leads to an increased efficiency of the system because less energy is needed to operate a corresponding conveying device, such as for example a pump, and moreover less additional heat generated by the conveying device during operation of the conveying device has to be removed from the cooling system.

A problem that is posed by the cooling system disclosed in DE 10 2006 005 035 B3 is, however, the high rest pressure of the refrigerant that may arise in the rest state of the system if the refrigerant in the rest state of the system is in the gaseous state. Whereas the rest pressure of the refrigerant in a liquid cooling system, in which for example Galden® is used as a refrigerant, is usually at most approx. 20 bar, in a cooling system designed for two-phase operation, in which for example $CO_2$ is used as a refrigerant, pressures of 170 to 220 bar may arise at a system temperature of approx. 85° C. Consequently, the line system of the cooling system is exposed to considerable loads and has to be designed accordingly.

DE 10 2009 011 797 A1 therefore proposes equipping a cooling system described in DE 10 2006 005 035 B3 with a control valve which is arranged in the cooling circuit of the cooling system and is controlled, upon transfer of the cooling system to its rest state, in such a way that a desired operating pressure arises in the cooling circuit downstream of the control valve. Refrigerant cooled by the refrigerating device is received in a reservoir arranged upstream of the control valve in the cooling circuit.

The operating method described in DE 10 2009 011 797 A1 is able effectively to prevent a region of the cooling circuit lying upstream of the control valve, i.e. the lines and other components, such as for example valves, heat exchangers etc., provided in this region of the cooling circuit, from being subjected in the rest state of the cooling system to the high maximum rest pressure of the two-phase refrigerant that arises if the refrigerant is in the gaseous state. Instead, the region of the cooling circuit lying downstream of the control valve may be kept under a comparatively low operating pressure.

In the cooling systems known from the prior art, there is the problem that it is frequently difficult to accommodate the system components in the very limited installation space available on board an aircraft or even position them relative to one another such that, for example, efficiency-optimised operation of the cooling system is made possible by utilising gravity in the process management.

SUMMARY

The underlying object of the invention is to provide a cooling system which is designed for operation with a two-phase refrigerant and enables a flexible and hence volume- and weight-optimised design of the cooling system. Furthermore, the underlying object of the invention is to specify a method for operating such a cooling system.

These objects are achieved by a cooling system having the features of Claim 1 and by a method for operating a cooling system having the features of Claim 8.

A cooling system according to the invention which is suitable, in particular, for cooling food on board an aircraft comprises a cooling circuit. The cooling circuit supplies cooling energy to at least one cooling station. A refrigerant circulating in the cooling circuit is selected such that it can be converted from the liquid to the gaseous state of aggregation on releasing its cooling energy to the at least one cooling station and subsequently converted back to the liquid state of aggregation again by an appropriate pressure and temperature control in the cooling circuit. $CO_2$ or R134A ($CH_2F$—$CF_3$), for example, may be used as the refrigerant.

The cooling system according to the invention is equipped with a refrigerant container which comprises a receiving space arranged in an interior space of the refrigerant container and intended for receiving the refrigerant circulating in the cooling circuit. The receiving space of the refrigerant container is connected to the cooling circuit by a flow line for discharging the refrigerant from the receiving space and by a return line for returning the refrigerant into the receiving space.

During operation of the cooling system and in particular in the rest state of the cooling system, the refrigerant container may serve to receive refrigerant circulating in a cooling circuit of the cooling system during operation of the cooling system. The refrigerant may be supplied to the refrigerant container in the liquid or in the gaseous state of aggregation or as wet steam.

Preferably, the receiving space of the refrigerant container is designed such that it is able to safely receive a total amount of refrigerant to be received in the receiving space, even if the refrigerant is completely in the gaseous state of aggregation. The receiving space or an enclosure surrounding the receiving space then has to be designed such that it can withstand the pressure of the refrigerant in the gaseous state of aggregation without being damaged. Preferably, the receiving space is large enough to receive the total amount of refrigerant circulating in the cooling circuit of the cooling system during operation of the cooling system. The refrigerant container is thus usable as a high-pressure collector for the refrigerant circulating in the cooling circuit during operation of the cooling system.

There is arranged in the receiving space of the refrigerant container a heat exchanger allowing the passage of a further refrigerant therethrough and being adapted to remove heat from refrigerant received in the receiving space in the liquid and/or gaseous state of aggregation, in order to supercool the refrigerant and/or convert it to the liquid state of aggregation. As a result, besides its function as a high-pressure collector, the refrigerant container can perform the functions of a liquefier. The use of a separate liquefier can therefore optionally be dispensed with. If the refrigerant is in the liquid state of aggregation, it can be supercooled on the heat removal. If the refrigerant received in the receiving space of the refrigerant container has a lower temperature than the further refrigerant flowing through the heat exchanger, the refrigerant container can also be operated as a cold reservoir and cooling energy from refrigerant received in the receiving space of the refrigerant container can be transferred to the further refrigerant flowing through the heat exchanger. The refrigerant container usable as a high-pressure collector, liquefier or cold reservoir enables different functionalities to be realised in a very small installation space. Furthermore, the refrigerant container enables particularly flexible operation of a cooling system equipped with the refrigerant container.

The further refrigerant supplied to the heat exchanger may be a different refrigerant to the refrigerant intended for reception in the receiving space of the refrigerant container. For example, a gaseous or a liquid refrigerant, but also a two-phase refrigerant, in particular $CO_2$ or R134A, may be used. If desired, the refrigerant intended for reception in the receiving space of the refrigerant container may also be supplied to the heat exchanger as the further refrigerant, at least in certain operating phases of the cooling system. The further refrigerant may be cooled to a desired low temperature by a refrigerating device formed separately from the refrigerant container before it is supplied into the heat exchanger. For this purpose, the cooling system may comprise a suitable refrigerating device.

During operation of the heat exchanger integrated into the receiving space of the refrigerant container, preferably liquid refrigerant is discharged from the receiving space of the refrigerant container through the flow line. The return line is preferably adapted to lead gaseous refrigerant or refrigerant present as wet steam into the receiving space of the refrigerant container.

The flow line is preferably connected to a sump of the receiving space. The return line is preferably connected to the receiving space of the refrigerant container in an upper region of refrigerant container opposite the sump. If desired however, at least in certain operating phases of the cooling system, refrigerant may be supplied into the receiving space of the refrigerant container also via the flow line connected to a sump of the receiving space and refrigerant may be discharged from the receiving space of the refrigerant container via the return line connected to the receiving space of the refrigerant container in an upper region of the refrigerant container.

Furthermore, it is conceivable at least in certain operating phases of the cooling system, to use both the flow line and the return line for discharging refrigerant from the receiving space of the refrigerant container. For example, the return line connected to the receiving space of the refrigerant container in an upper region of the refrigerant container may be used to discharge gaseous refrigerant from the receiving space of the refrigerant container. In contrast to this, the flow line connected to a sump of the receiving space may be used to discharge refrigerant, liquefied by heat transfer to the heat exchanger, from the receiving space of the refrigerant container. The refrigerant container can thus also be used as a separator for separating gaseous and liquid refrigerant.

A flow control valve for controlling the flow of the refrigerant through the flow line is preferably arranged in the flow line. Alternatively or additionally to this, a return control valve for controlling the flow of the refrigerant through the return line may be arranged in the return line. Since the refrigerant may be supplied into the receiving space or discharged from the receiving space both in the gaseous and in the liquid state of aggregation, the flow valve and/or return valve are preferably also suitable for controlling the pressure of the refrigerant flowing through the flow line and the return line, respectively. Alternatively or additionally, appropriate pressure reducers may be arranged in the flow line and/or the return line.

The flow control valve and/or the return control valve may disconnect the refrigerant container from components of the cooling system arranged downstream of the flow control valve and upstream of the return control valve, respectively. It is thereby possible to effectively prevent components of the cooling system which are disposed downstream of the flow control valve and/or upstream of the return control valve from being subjected to the high maximum rest pressure of the refrigerant, in the rest state of the cooling system when the refrigerant circulating in the cooling circuit during operation of the cooling system is received in the receiving space of the refrigerant container in the gaseous state of aggregation. Instead, the components arranged in this region of the cooling circuit can be maintained under a comparatively low operating pressure.

The mechanical loads to which the cooling circuit and other components of the cooling system are subjected can thereby be markedly reduced. A design of these components adapted to the reduced mechanical loads therefore enables weight and volume reductions which have a beneficial effect particularly when the cooling system is used on board an aircraft and result in a reduction of the manufacturing and operating costs. Moreover, a cooling system is distinguished by increased operating reliability and reduced leakage susceptibility owing to the reduced pressure prevailing in wide regions of the cooling circuit in the rest state of the cooling system. Finally, assembly and maintenance work is simplified.

The cooling system preferably comprises a conveying device which is adapted to discharge the refrigerant substantially in its liquid state of aggregation from the receiving space of the refrigerant container and/or to discharge the refrigerant substantially in its gaseous state of aggregation from the at least one cooling station.

If the conveying device is adapted to discharge the refrigerant substantially in its liquid state from the receiving space of the refrigerant container, it is preferably arranged between the sump of the receiving space of the refrigerant container and the place in the cooling circuit at which the refrigerant enters the cooling station. In this region of the cooling circuit, the refrigerant is completely in the liquid state of aggregation, or at least mostly or partially in the liquid phase. In such an arrangement, the conveying device is preferably configured as a pump. Compared with a compressor, a pump offers the advantage of a having a small size, a low energy consumption and a lower weight. The pump may be, for example, a gear pump, a peripheral pump, a side channel pump, a plunger pump or a centrifugal pump. A side channel pump or a peripheral pump has the advantage of also being able to convey a high proportion of gas.

If the conveying device is adapted to discharge the refrigerant substantially in its gaseous state of aggregation from the at least one cooling station, it is preferably arranged between the upper region of the refrigerant container opposite the sump and the place in the cooling circuit at which the refrigerant exits the cooling station. In this region of the cooling circuit, the refrigerant is completely in the gaseous state of aggregation, or at least mostly or partially in the gaseous phase. In such an arrangement, the conveying device is preferably configured as a compressor or a vacuum pump. The advantage of a compressor is that liquid pockets can be evaporated from the cooling circuit in that the refrigerant container is run at low temperatures and warm and compressed, gaseous refrigerant flows through the cooling circuit.

The conveying device may also simultaneously comprise a pump and a compressor, in which case the pump is then to be understood as a conveying device which discharges the refrigerant substantially in its liquid state of aggregation from the receiving space of the refrigerant container, and the compressor is to be understood as a conveying device which discharges the refrigerant substantially in its gaseous state of aggregation from the at least one cooling station.

The conveying device serves, in particular, for conveying the refrigerant through the cooling circuit. In this case, the conveying device may convey the refrigerant at at least one first conveying speed different from zero and at at least one second conveying speed different from zero. For example, the conveying speeds of the conveying device may correspond to given rotational speeds of a conveying blade or a conveying propeller of the conveying device. The at least one first and the at least one second conveying speed may differ. This makes it possible to drive the refrigerant in the cooling circuit of the cooling system at at least two different speeds.

The conveying device may also be controlled to convey the refrigerant at such a large number of first and second conveying speeds that a continuous transition between the individual conveying speeds is possible. In other words: the conveying device may be adapted to convey the refrigerant at a continuously variably controllable conveying speed.

Preferably, at least one first conveying speed is slower than at least one second conveying speed. It is thus possible, on conveying the refrigerant at the first conveying speed, for the speeds, acting by the conveying device on the refrigerant to be conveyed, to be kept low. It is thereby possible to reduce or even completely avoid cavitation, i.e. a local gas phase formation, in the liquid refrigerant. A separation of the conveying flow is thus prevented. The at least one first conveying speed of the conveying device thus acts in a stabilising manner on the conveying process of the refrigerant. The conveying device is therefore preferably operated at a first conveying speed when the cooling system is transferred from its rest state to the normal operation or when the refrigerant is accelerated from a rest position. The at least one second conveying speed may serve for the normal operation of the cooling system in which a second conveying speed greater than the first conveying speed ensures a sufficient conveying mass flow of the refrigerant through the cooling circuit.

In order to be able to avoid cavitation even more reliably, the cooling system is preferably equipped with at least one sensor connected to a control unit and adapted to measure at least one signal representative of the supercooling of the refrigerant. Such a signal may be indicative of, for example, a temperature, a pressure, a flow speed and/or a density of the refrigerant. The measurement is preferably carried out in the region of the conveying device. On the basis of the signal, the control unit may determine a measure representative of the supercooling of the refrigerant from a bubble-point curve of the refrigerant stored by closed-loop control. The control unit may be adapted to control the conveying device in its conveying speed in dependence on the signal representative of the supercooling of the refrigerant. If, for instance, a signal representative of a low supercooling of the refrigerant is detected by the sensor, the control unit may control the conveying device via a corresponding connection in such a way that the conveying device is operated at a slow first conveying speed. Alternatively or additionally, on detection of a signal representative of a high supercooling of the refrigerant, the control unit may control the conveying device in such a way that the conveying device is operated at a second conveying speed higher than the first conveying speed.

The flow line may comprise a cooling line branch, in which the at least one cooling station is arranged, and a bypass branch connected in parallel with the cooling line branch, the cooling line branch and the bypass branch leading into the return line. The refrigerant can thus be led past the cooling station without having to flow through the cooling station. A bypass control valve may be adapted to control the flow of the refrigerant through the cooling line branch and/or the bypass branch. This enables a cold running of the components of the cooling circuit outside the region in which the cooling station is arranged. This is useful particularly on the transition of the cooling system from its rest state to the normal operation when at least parts of the cooling circuit are heated up and a partial evaporation of the liquid refrigerant is to be feared. By control of the bypass valve, the refrigerant can be led past the cooling station until the refrigerant is sufficiently supercooled. Subsequently, by appropriate control of the bypass valve, the refrigerant can be led to the cooling station in order to enable cooling at the cooling station.

The cooling system preferably has a cooling station control valve which is connected upstream of the cooling station and is adapted to control the pressure of the refrigerant at the cooling station. Preferably, the cooling station control valve is adapted to partially or completely evaporate the refrigerant by expansion. By varying the pressure, it is thus also possible to control the evaporation temperature of the refrigerant with the aid of the cooling station control valve. Moreover, the cooling station control valve may control an expansion of the refrigerant in the region downstream of the cooling station control valve. This enables a temperature reduction of the refrigerant and may result in the refrigerant being less supercooled. Furthermore, the cooling station control valve may serve to prevent a backflow of the refrigerant, for instance in the direction of a conveying device.

In a method according to the invention for operating a cooling system, in particular for cooling food on board an aircraft, cooling energy is supplied to at least one cooling station by means of a cooling circuit, in which circulates a refrigerant which is converted at least partially from the liquid to the gaseous state of aggregation on releasing its cooling energy to the at least one cooling station and subsequently converted back at least partially to the liquid state of aggregation again by an appropriate pressure and temperature control in the cooling circuit. Furthermore, a refrigerant container is provided which comprises a receiving space arranged in an interior space of the refrigerant container and intended for receiving the refrigerant circulating in the cooling circuit, the receiving space of the refrigerant container being connected to the cooling circuit by a flow line for discharging the refrigerant from the receiving space and by a return line for returning the refrigerant into the receiving space. A further refrigerant flows through a heat exchanger arranged in the receiving space of the refrigerant container and heat is removed from refrigerant received in the receiving space in the liquid and/or gaseous state of aggregation, in order to supercool the refrigerant and/or convert it to the liquid state of aggregation.

Preferably, a flow control valve arranged in the flow line may control the flow of the refrigerant through the flow line and/or a return control valve arranged in the return line may control the flow of the refrigerant through the return line.

A conveying device may discharge the refrigerant substantially in its liquid state of aggregation from the receiving space of the refrigerant container and/or discharge the refrigerant substantially in its gaseous state of aggregation from the at least one cooling station.

The conveying device may convey the refrigerant at a continuously variably controllable conveying speed.

At least one sensor connected to a control unit may measure at least one signal representative of the supercooling of the refrigerant. The control unit may control the conveying device in its conveying speed in dependence on the signal representative of the supercooling of the refrigerant.

The flow line may comprise a cooling line branch, in which the cooling station is arranged, and a bypass branch connected in parallel with the cooling line branch, the cooling line branch and the bypass branch leading into the return line and a bypass control valve controlling the flow of the refrigerant through the cooling line branch and/or the bypass branch.

A cooling station control valve connected upstream of the cooling station may control the pressure of the refrigerant at the cooling station.

The cooling system according to the invention is particularly well suited for use in an aircraft for cooling food.

BRIEF DESCRIPTION OF THE DRAWINGS

Preferred embodiments of the invention will now be explained in more detail with reference to the appended schematic drawings, of which.

DETAILED DESCRIPTION

Figure 1:
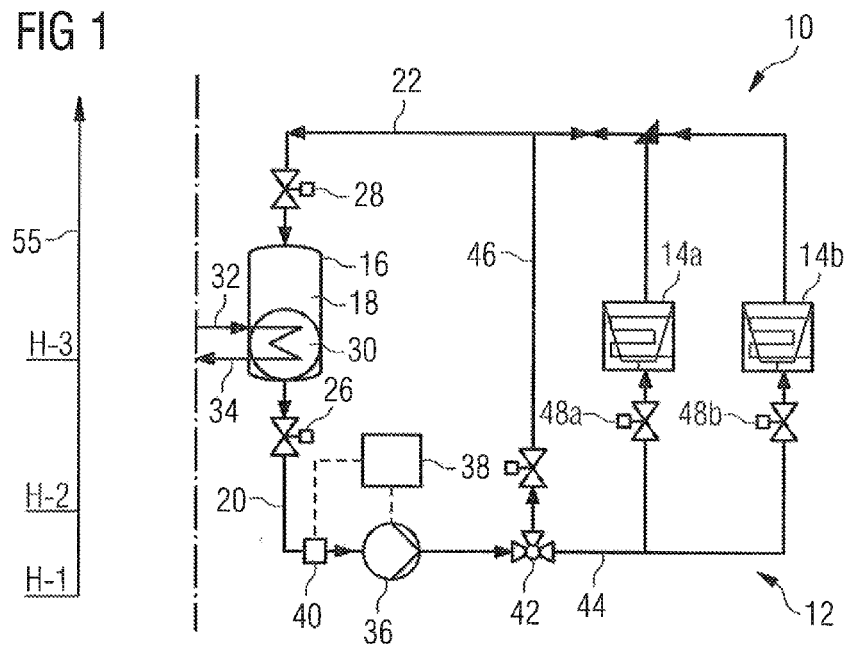
FIG. 1 shows a first embodiment of a cooling system suitable for use in an aircraft.

FIG. 1 shows a first embodiment of a cooling system 10 which is suitable in particular for cooling food on board an aircraft. The cooling system 10 comprises a cooling circuit 12 which supplies cooling energy to two cooling stations 14a and 14b. A refrigerant circulates in the cooling circuit 12. Arrows mark the flow direction of the refrigerant in the cooling circuit 12. The refrigerant is converted from the liquid to the gaseous state of aggregation on releasing its cooling energy to the cooling stations 14a, 14b and subsequently converted back to the liquid state of aggregation again by appropriate pressure and temperature control in the cooling circuit 12. The cooling stations 14a, 14b thus have the function of an evaporator and constitute the interface between the cooling circuit 12 and a system to be cooled.

The cooling system 10 further comprises a refrigerant container 16 which comprises a receiving space 18 arranged in an interior space of the refrigerant container for receiving the refrigerant circulating in the cooling circuit 12.

For example, the receiving space 18 of the refrigerant container 16 may be provided to receive $CO_2$ or R134A. The receiving space 18 of the refrigerant container 16 is designed such that it can receive the total amount of refrigerant circulating in the cooling circuit 12 during operation of the cooling system 10, even if the refrigerant, for example in the rest state of the cooling system 10, is in the gaseous state of aggregation. The receiving space 18, which is formed by an outer casing of the refrigerant container 16 in the first embodiment of the refrigerant container 16 shown in FIG. 1, is consequently designed such that it can withstand the pressure of the refrigerant in the gaseous state without being damaged. The refrigerant container 16 is thus usable as a high-pressure collector for the refrigerant circulating in the cooling circuit 12 during operation of the cooling system 10.

The receiving space 18 of the refrigerant container 16 is connected to the cooling circuit 12 by a flow line 20 for discharging the refrigerant from the receiving space 18 and by a return line 22 for returning the refrigerant into the receiving space 18. The return line 22 is connected to the receiving space 18 in an upper region of the refrigerant container 16. The flow line 20 is connected to a sump of the receiving space 18. Refrigerant can be supplied to the receiving space 18 of the refrigerant container 16 and/or refrigerant can be discharged from the receiving space 18 of the refrigerant container 16 through the flow line 20 and the return line 22.

In the flow line 20 is arranged a flow control valve 26 for controlling the flow of the refrigerant through the flow line 20. Furthermore, in the return line 22 is arranged a return control valve 28 for controlling the flow of the refrigerant through the return line 22. The flow control valve 26 and the return control valve 28 are also suitable for controlling the pressure of the refrigerant flowing through the flow line 20 and the return line 22, respectively. In particular, however, the flow control valve 26 and the return control valve 28 serve to disconnect the refrigerant container 16 or the receiving space 18 of the refrigerant container 16 from components of the cooling system 10 arranged downstream of the flow control valve 26 and upstream of the return control valve 28. It is thereby possible to effectively prevent components of the cooling system 10 lying downstream of the flow control valve 26 and upstream of the return control valve 28 from being subjected to high pressure, in operating phases of the cooling system 10 in which the refrigerant circulating in the cooling circuit 12 during normal operation of the cooling system 10 is received in the receiving space 18 of the refrigerant container 16 in the gaseous state of aggregation. Instead, these components can be maintained under a comparatively low operating pressure.

A heat exchanger 30 is arranged in the receiving space 18 of the refrigerant container 16. The heat exchanger 30 has a further refrigerant flowing through it and removes heat from refrigerant received in the receiving space 18 and present in the gaseous or liquid state of aggregation, in order to convert the refrigerant to the liquid state of aggregation or supercool it. The further refrigerant supplied to the heat exchanger 30 may be a different refrigerant to the refrigerant intended for reception in the receiving space 18 of the refrigerant container 16. For example, a gaseous or a liquid refrigerant, but also a two-phase refrigerant, in particular $CO_2$ or R134A, may be used as further refrigerant. If desired, the refrigerant intended for reception in the receiving space 18 of the refrigerant container 16 may also be supplied to the heat exchanger 30 as the further refrigerant, at least in certain operating phases of the cooling system 10. The further refrigerant may be cooled to a desired low temperature by a refrigerating device formed separately from the refrigerant container 16 before it is supplied into the heat exchanger 30. For this purpose, the cooling system may comprise a suitable refrigerating device, as explained in more detail below in the description of FIGS. 2 and 3.

The heat exchanger 30 is connected to a first heat exchanger line 32 for supplying the further refrigerant into the heat exchanger 30 and to a second heat exchanger line 34 for discharging the further refrigerant from the heat exchanger 30. The cooling system 10 further comprises a conveying device 36 which is adapted to discharge the refrigerant in its liquid state of aggregation from the receiving space 18 of the refrigerant container 16. The conveying device 36 is arranged in the flow line 20 downstream of the flow control valve 26. In this region of the cooling circuit 12, the refrigerant is substantially in the liquid state of aggregation.

The conveying device 36 is configured as a pump and may convey the refrigerant at at least one first conveying speed different from zero or at at least one second conveying speed different from zero and greater than the first conveying speed. The conveying speeds of the conveying device 36 correspond here to given rotational speeds of the pump.

The conveying device 36 is connected to a control unit 38. The control unit 38 is further connected to a sensor 40 which is arranged in the flow line 20 upstream of the conveying device 36 in the immediate vicinity of the conveying device 36 and measures a signal representative of the supercooling of the refrigerant. Such a signal may be indicative of, for example, a temperature, a pressure, a flow speed and/or a density of the refrigerant. On the basis of the signal, the control unit 38 may determine a measure representative of the supercooling of the refrigerant and control the conveying device 36 in its conveying speed in dependence thereon.

A bypass control valve 42 is arranged in the flow line 20 downstream of the conveying device 36. Branching off from the bypass control valve 42 is a cooling line branch 44, in which the cooling stations 14a, 14b are arranged in parallel connection. Also branching off from the bypass control valve 42 is a bypass branch 46 connected in parallel with the cooling line branch 44. The cooling line branch 44 and the bypass branch 46 finally lead into the return line 22.

Connected upstream of the cooling stations 14a, 14b is respectively one cooling station control valve 48a and 48b. The cooling station control valves 48a, 48b control the pressure of the refrigerant at the corresponding cooling stations 14a, 14b.

The functioning and operation of the cooling system 10 are explained in more detail below.

As already mentioned, the receiving space 18 of the refrigerant container 16 is designed such that it can receive the total amount of refrigerant circulating in the cooling circuit 12 during operation of the cooling system 10 when the cooling system 10 is in its rest state. On stopping the cooling system, therefore, the refrigerant circulating in the cooling circuit 12 can be conveyed into the receiving space 18 of the refrigerant container 16 until the total amount of the refrigerant is received in the receiving space 18 of the refrigerant container 16 in the rest state of the cooling system 10. The refrigerant can be supplied to the refrigerant container 16 in the liquid or in the gaseous state of aggregation or as wet steam.

In any case, the refrigerant in the receiving space 18 evaporates if the ambient temperature exceeds the evaporation temperature of the refrigerant and the refrigerant container 16 is not cooled. The flow control valve 26 and the return control valve 28, however, prevent the pressure of the gaseous refrigerant in the receiving space 18 of the refrigerant container 16 from being transmitted to components of the cooling system 10 lying downstream of the flow control valve 26 and upstream of the return control valve 28. In the rest state of the cooling system 10, the refrigerant container 16 thus serves as a high-pressure collector.

If, for example on starting the cooling system 10, part of the gaseous refrigerant is to be let out of the receiving space 18 into the cooling circuit 12, the refrigerant in the receiving space 18 may be discharged via the flow line 20 and supplied via the return line 22. The pressure is controlled here via the flow control valve 26 and the return control valve 28.

Furthermore, on starting the cooling system 10, the gaseous refrigerant received in the receiving space 18 may be liquefied, i.e. the refrigerant container 16 can be operated as a liquefier. For this purpose, further refrigerant cooled to a low temperature is supplied by an external refrigerating device to the heat exchanger 30 via the first heat exchanger line 32. On flowing through the heat exchanger 30, the further refrigerant evaporates, releasing cooling energy to the gaseous refrigerant received in the receiving space 18. The further refrigerant evaporated on flowing through the heat exchanger 30 is discharged from the heat exchanger 30 and the refrigerant container 16 via the second heat exchanger line 34 and is led to the external refrigerating device for recooling, before being recirculated into the heat exchanger 30 again via the first heat exchanger line 32. By contrast, the refrigerant received in the receiving space 18 is liquefied by the transfer of heat energy to the further refrigerant flowing through the heat exchanger 30. As a result, the pressure in the receiving space 18 falls.

At the beginning of the liquefying operation, the flow control valve 26 and the return control valve 28 remain closed, in order to protect components of the cooling system 10 lying downstream of the flow control valve and upstream of the return control valve 28 from the high pressure in the receiving space 18. By contrast, when the pressure in the receiving space 18 has fallen to a desired low level by liquefaction of a corresponding proportion of the refrigerant received in the receiving space 18, a fluid-conducting connection may be established between the receiving space 18 and the cooling circuit 12 of the cooling system 10 by opening the flow control valve 26 and/or the return control valve 28.

During normal operation of the cooling system 10, refrigerant present as wet steam is usually supplied to the refrigerant container 16 via the return line 22. The refrigerant present as wet steam is liquefied by the transfer of heat energy to the further refrigerant flowing through the heat exchanger 30 and can be discharged in the liquid state from the sump of the receiving space 18 into the cooling circuit 12 via the flow line 20. During normal operation of the cooling system 10, further refrigerant is usually continuously circulated through the heat exchanger 30.

Owing to the condensation of the gaseous refrigerant in the refrigerant container 16, the volume of the refrigerant is reduced. This results in an underpressure in the flow line 20 relative to the return line 22. This effect can be further increased by an adapted height difference between refrigerant container 16 and the cooling stations 14a, 14b.

The discharge of the liquid refrigerant from the receiving space 18 is assisted by the conveying device 36. On starting the cooling system, the conveying device 36 operates at a first conveying speed. The first conveying speed is so low that the speeds acting by the conveying device 36 on the refrigerant to be conveyed are kept low. It is thereby possible to reduce or even completely avoid cavitations, i.e. a local gas phase formation, in the liquid refrigerant. During normal operation of the cooling system 10, the conveying device is controlled such that a second conveying speed greater than the first conveying speed ensures a sufficient conveying mass flow of the refrigerant through the cooling circuit 12.

The control of the conveying speed of the conveying device 36 may also be continuously variable. The first and second conveying speed then constitute merely two possible conveying speeds in a whole range of possible conveying speeds different from one another.

In order to avoid a separation of the conveying mass flow, the control unit 38 controls the conveying device 36 in such a way that the conveying speed of the conveying device 36 is adapted to the degree of supercooling of the refrigerant. For this purpose, the sensor 40 measures the signal representative of the supercooling of the refrigerant and sends this signal to the control unit 38. From the signal received from the sensor 40, the control unit 38 determines a conveying speed at which it controls the conveying device 36. Such a control of the conveying device 36 thus acts in a stabilising manner on the process of conveying the refrigerant.

On starting the cooling system 10, the bypass branch 46 in the cooling circuit 12 is additionally used. The bypass control valve 42 in this case controls the flow of the refrigerant through the cooling line branch 44 and the bypass branch 46 in such a way that the refrigerant initially flows solely from the flow line 20 via the bypass branch 46 into the return line 22 without passing through the cooling stations 14a, 14b. This enables a cold running of the components of the cooling circuit 12 outside the region in which the cooling stations 14a, 14b are arranged. Since these components may be heated up prior to starting the cooling system 10, part of the refrigerant evaporates and thus cools down the components. By control of the bypass control valve 42, the refrigerant is led past the cooling stations 14a, 14b until the refrigerant is sufficiently supercooled. Subsequently, the bypass control valve 42 controls the flow of the refrigerant through the cooling line branch 44 and the bypass branch 46 in such a way that the refrigerant flows more and more through the cooling line branch 44 and correspondingly less through the bypass branch 46, until finally the refrigerant flows solely through the cooling line branch 44 and enables a cooling at the cooling stations 14a, 14b during normal operation of the cooling system 10.

Depending on the design of the cooling system 10 and the ambient conditions, the use of the bypass control valve 42 can also be omitted. The refrigerant can then be conveyed solely via the cooling line branch 44 to the cooling stations 14a, 14b. The bypass control valve 42 can then serve, during normal operation of the cooling system 10, to limit the cooling capacity at the cooling stations 14a, 14b, if required.

During normal operation, the cooling station control valves 48a, 48b connected upstream of the cooling stations 14a, 14b control the pressure of the refrigerant at the cooling stations 14a, 14b. The pressure is also determined by the return control valve 28. The cooling station control valves 48a, 48b in this case serve to partially or completely evaporate the refrigerant by expansion. By varying the pressure, the evaporation temperature of the refrigerant is thus also controlled. The cooling station control valves 48a, 48b control the pressure of the refrigerant in such a way that a temperature reduction of the refrigerant in the region of the cooling stations 14a, 14b is achieved. Moreover, the cooling station control valves 48a, 48b reliably prevent a backflow of the refrigerant in the direction of the bypass control valve 42 or the conveying device 36.

The complete evaporation in the cooling stations is also called dry evaporation. In this case, the refrigerant is to be appropriately metered in the cooling stations 14a, 14b. In so doing, the latent heat of the refrigerant is fully utilised, so that particularly intense and efficient cooling of the cooling stations 14a, 14b is possible. The conveying mass flow of the refrigerant transported to the cooling stations 14a, 14b can thus also be reduced. As a result, only a small total amount of refrigerant is needed. It is then also possible for the pipelines of the cooling circuit 12 to be dimensioned with small diameters.

During operation of the dry evaporation, the refrigerant can be supplied to the cooling stations 14a, 14b batchwise by appropriate control of the cooling station control valves 48a, 48b.

Alternatively, the cooling stations 14a, 14b may, however, also be supplied with the refrigerant continuously by appropriate control of the cooling station control valves 48a, 48b.

As an alternative to the dry evaporation, it is also possible that by control of the cooling station control valves 48a, 48b such a large conveying mass flow of refrigerant is supplied to the cooling stations 14a, 14b that the evaporation capacity of the cooling stations 14a, 14b is not sufficient to evaporate the entire conveying mass flow of refrigerant supplied to the cooling stations 14a, 14b. This operation is called flooded evaporation and ensures that peaks in the cooling capacity requirement of the cooling stations 14a, 14b can also be reliably covered.

If only a low cooling capacity is required at the cooling stations 14a, 14b, the cooling station control valves 48a, 48b may be partially closed and thus reduce the conveying mass flow of the refrigerant through the cooling stations 14a, 14b. The excess conveying mass flow of the refrigerant is in this case conveyed via the bypass branch 46 into the receiving space 18 of the refrigerant container 16 by appropriate control of the bypass control valve 42.

During assembly and maintenance work on the cooling system 10, the entire refrigerant is conveyed into the receiving space 18 of the refrigerant container 16 and subsequently the flow control valve 26 and the return control valve 28 are closed. This allows work to be carried out on all the components of the cooling system 10 which are arranged downstream of the flow control valve 26 and upstream of the return control valve 28 in the cooling circuit 12, without liquid or gaseous refrigerant escaping from the cooling system 12. This facilitates assembly and maintenance work on the cooling system 10.

Figure 2:
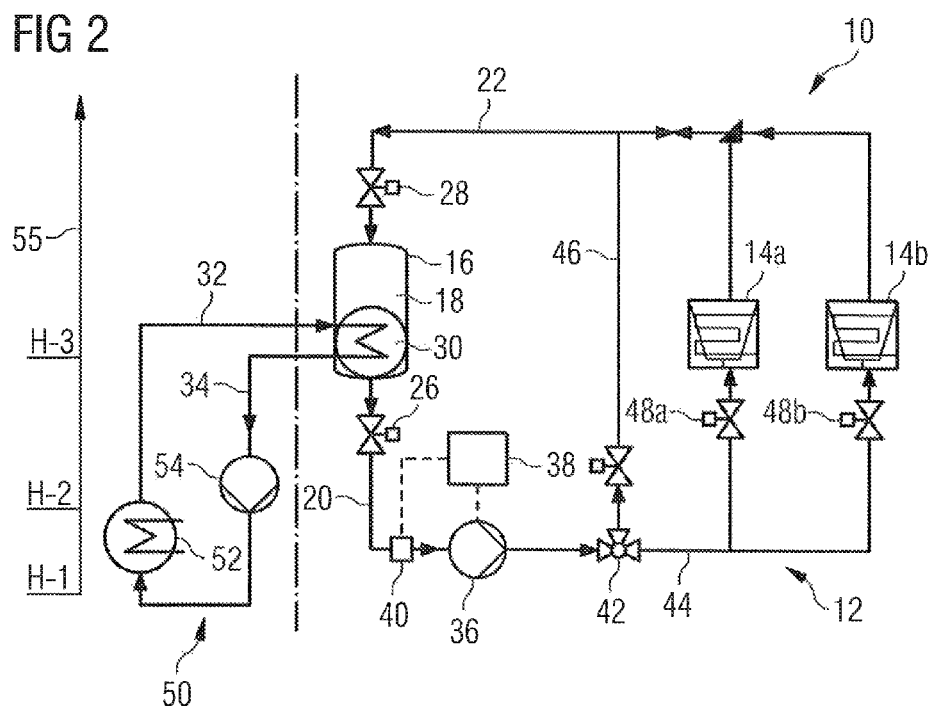
FIG. 2 shows a second embodiment of a cooling system suitable for use in an aircraft.

The second embodiment of a cooling system 10 illustrated in FIG. 2 differs from the arrangement according to FIG. 1 merely in that the cooling system 10 has a refrigerating device 50. The further refrigerant is in this case formed as liquid refrigerant and the cooling circuit in the refrigerating device 50 is operated without phase change. In this case, the first heat exchanger line 32 is connected to the outlet of a refrigerating machine 52. The second heat exchanger line 34 is connected to the inlet of the refrigerating machine 52.

The refrigerating device 50 further comprises a pump 54 for conveying the further refrigerant in the direction of the refrigerating machine 52. The cooling circuit in which the further refrigerant circulates may comprise, in addition to the components shown in FIG. 2, also further components, such as control valves, valves or equalising tanks. Preferably, the pipelines of the refrigerating device 50 illustrated in FIG. 2 are of such a short design that it is possible to dispense with the use of an equalising tank in the cooling circuit of the refrigerating device 50. Instead, a fabric-reinforced rubber or plastic hose may be used as a pipeline, which hose can expand on expansion of the further refrigerant. The size of the diameter of the hose may also be adapted to the properties of the further refrigerant. Thus, a greater diameter of the hose improves the thermal volume equalisation.

Figure 3:
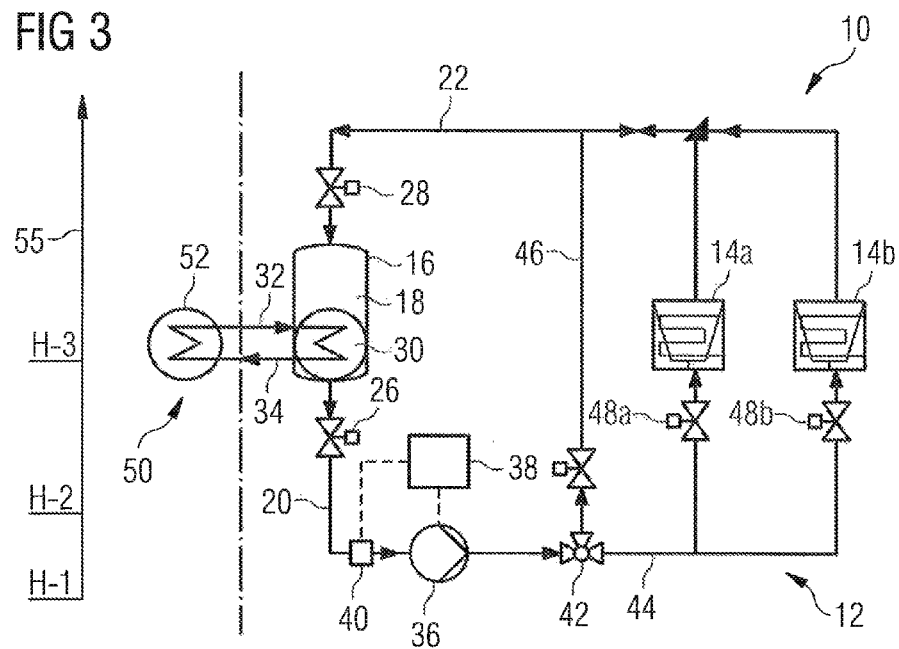
FIG. 3 shows a third embodiment of a cooling system suitable for use in an aircraft.

The third embodiment of a cooling system 10 illustrated in FIG. 3 differs from the arrangement according to FIG. 1 only in that the cooling system has a refrigerating device 50. The further refrigerant is in this case formed as a two-phase refrigerant, as is the refrigerant. The refrigerating machine 52 of the refrigerating device 50 is directly connected to the heat exchanger 30 via the first and the second heat exchanger line 32, 34. A pump can be dispensed with, thereby enabling a weight and volume reduction.

Alongside the cooling system 10 in FIGS. 1 to 3 can be seen a qualitative height scale 55, which gives an indication of the height at which the components of the cooling system 10 are located when the cooling system 10 is installed in the aircraft. H-1 represents a low height, H-2 represents a medium height and H-3 represents a great height above a lowest point of the underside of the aircraft. Owing to the height arrangements of the individual components of the cooling system 10 illustrated in FIGS. 1 to 3 and the resulting height differences, it is possible to ensure or increase a gravitationally driven natural circulation. A natural circulation is ensured particularly if the sump of the receiving space of the refrigerant container is located higher than the place in the cooling circuit at which the refrigerant enters the cooling station.

Figure 4:
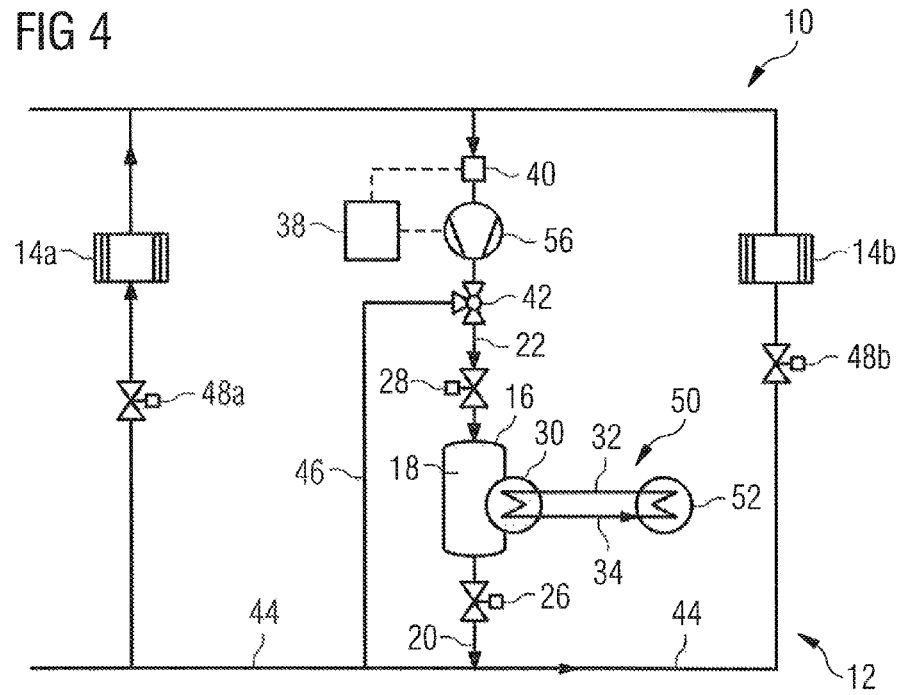
FIG. 4 shows a fourth embodiment of a cooling system suitable for use in an aircraft.

FIG. 4 shows a fourth embodiment of a cooling system 10, which differs from the first embodiment of the cooling system 10 shown in FIG. 1 in that the conveying device is configured as a compressor or vacuum pump 56 and performs the conveyance of the refrigerant which is present predominantly in its gaseous phase. The conveying device 56 is arranged in the return line 22 upstream of a point at which the bypass branch 46 and the cooling line branch 44 coming from the cooling stations 14a, 14b lead into the return line 22. The gaseous refrigerant is conveyed by the conveying device 56 into the receiving space 18 of the refrigerant container 16 in order to maintain the refrigerant container 16 at overpressure. In this way, the liquid refrigerant is conveyed from the sump of the receiving space 18 of the refrigerant container 16 also into the cooling circuit 12 of the cooling system 10 to the cooling stations 14a, 14b.

The advantage of a conveying device 56 configured as a compressor is that liquid pockets can be more easily evaporated from the cooling circuit 12 in that the refrigerant container 16 is run at low temperatures and warm and compressed gaseous refrigerant flows through the cooling circuit 12.

If required, in the embodiment of the cooling system 10 shown in FIG. 4, a conveying device 36 can be positioned according to FIGS. 1 to 3. In FIG. 4, the bypass control valve 42 is arranged at the point in the cooling circuit 12 where the bypass branch 46 and the cooling line branch 44 coming from the cooling stations 14a, 14b lead into the return line 22. Thus, the bypass control valve 42 is alternatively placed in the cooling circuit 12 compared with the arrangements shown in FIGS. 1 to 3. The bypass control valve 42 has in FIG. 4 the task of leading the gaseous refrigerant past the refrigerant container 16 and of evaporating and carrying off liquid refrigerant from any liquid pockets that may be present in the cooling circuit 12.

The components of the cooling system 10 shown in FIGS. 1 to 4 which are arranged downstream of the flow control valve 26q and upstream of the return control valve 28 in the cooling circuit 12, such as for example the control valves 42, 48a, 48b or the pipelines of the cooling system 12, are preferably designed for low pressures. As a result, these components can be designed lighter in weight, thus reducing the weight of the entire cooling system 10.

Alternatively to this, the components which are arranged downstream of the flow control valve 26 and upstream of the return control valve 28 in the cooling circuit 12 may, however, also be designed such that they can withstand high pressures, just like the flow control valve 26, the return control valve 28 and the receiving space 18 of the refrigerant container 16. This has the advantage that, on switching off the cooling system 10, the refrigerant does not have to be liquefied and conveyed into the receiving space 18 of the refrigerant container 16. A pressure rise in the cooling circuit 12, for instance due to evaporating liquid pockets in the pipelines of the cooling circuit 12, would then no longer have to be taken into account.

Features described here in connection with individual embodiments of the cooling system may of course also be realised in other embodiments of the cooling system. Features described in connection with specific embodiments of the cooling system are consequently transferable in any combination to other embodiments of the cooling system.

The invention claimed is:

1. A cooling system for cooling food on board an aircraft, comprising:
   a cooling circuit adapted to supply cooling energy to at least one cooling station, a first refrigerant circulating in the cooling circuit being selected such that the first refrigerant is convertible at least partially from the liquid to the gaseous state of aggregation on releasing its cooling energy to the at least one cooling station and subsequently convertible back at least partially to the liquid state of aggregation again by an appropriate pressure and temperature control in the cooling circuit;
   a refrigerant container which comprises a receiving space, the receiving space being located in an interior space of the refrigerant container and being intended for receiving the first refrigerant circulating in the cooling circuit, the receiving space of the refrigerant container being connected to the cooling circuit by a flow line for discharging the first refrigerant from the receiving space and by a return line for returning the first refrigerant into the receiving space; and
   a heat exchanger being located in the receiving space of the refrigerant container and allowing the passage of a second refrigerant therethrough and being adapted to remove heat from the first refrigerant received in the receiving space in the liquid and/or gaseous state of aggregation, in order to supercool the first refrigerant and/or convert it to the liquid state of aggregation.

2. The cooling system according to claim 1, wherein a flow control valve for controlling the flow of the first refrigerant through the flow line is arranged in the flow line and/or a return control valve for controlling the flow of the first refrigerant through the return line is arranged in the return line.

3. The cooling system according to claim 1, wherein a conveying device is adapted to discharge the first refrigerant being substantially in the liquid state of aggregation from the receiving space of the refrigerant container and/or to discharge the first refrigerant being substantially in the gaseous state of aggregation from the at least one cooling station.

4. The cooling system according to claim 3, wherein the conveying device is adapted to convey the first refrigerant at a continuously variably controllable conveying speed.

5. The cooling system according to claim 3, wherein a control unit and at least one sensor is connected to the control unit and intended for measuring at least one signal representative of the supercooling of the first refrigerant, the control unit being adapted to control the conveying device in its conveying speed in dependence on the signal representative of the supercooling of the first refrigerant.

6. The cooling system according to claim 1, wherein the flow line comprises a cooling line branch, in which the at least one cooling station is arranged, and a bypass branch connected in parallel with the cooling line branch, the cooling line branch and the bypass branch leading into the return line and a bypass control valve being adapted to control the flow of the first refrigerant through the cooling line branch and/or the bypass branch.

7. The cooling system according to claim 1, wherein a cooling station control valve is connected upstream of the cooling station and is adapted to control the pressure of the first refrigerant at the cooling station.

8. A method for operating a cooling system for cooling food on board an aircraft, comprising:
   supplying cooling energy to at least one cooling station by means of a cooling circuit, in which circulates a first refrigerant which is converted at least partially from the liquid to the gaseous state of aggregation on releasing cooling energy of the first refrigerant to the at least one cooling station and subsequently converting back at least partially to the liquid state of aggregation again by an appropriate pressure and temperature control in the cooling circuit; and
   providing a refrigerant container and a heat exchanger, the refrigerant container comprising a receiving space being located in an interior space of the refrigerant container and being intended for receiving the first refrigerant circulating in the cooling circuit, the receiving space of the refrigerant container being connected to the cooling circuit by a flow line for discharging the first refrigerant from the receiving space and by a return line for returning the first refrigerant into the receiving space, wherein a second refrigerant flows through the heat exchanger located in the receiving space of the refrigerant container and heat is removed from the first refrigerant received in the receiving space in the liquid and/or gaseous state of aggregation, in order to supercool the first refrigerant and/or convert it to the liquid state of aggregation.

9. The method according to claim 8, wherein a flow control valve arranged in the flow line controls the flow of the first refrigerant through the flow line and/or a return control valve arranged in the return line controls the flow of the first refrigerant through the return line.

10. The method according to claim 8, wherein a conveying device discharges the first refrigerant being substantially in the liquid state of aggregation from the receiving space of the refrigerant container and/or discharges the first refrigerant being substantially in the gaseous state of aggregation from the at least one cooling station.

11. The method according to claim 10, wherein the conveying device conveys the first refrigerant at a continuously variably controllable conveying speed.

12. The method according to claim 10, wherein at least one sensor connected to a control unit measures at least one signal representative of the supercooling of the first refrigerant, the control unit controlling the conveying device in its conveying speed in dependence on the signal representative of the supercooling of the first refrigerant.

13. The method according to claim 8, wherein the flow line comprises a cooling line branch, in which the cooling station is arranged, and a bypass branch connected in parallel with the cooling line branch, the cooling line branch and the bypass branch leading into the return line and a bypass control valve controlling the flow of the first refrigerant through the cooling line branch and/or the bypass branch.

14. The method according to claim 8, wherein a cooling station control valve connected upstream of the cooling station controls the pressure of the first refrigerant at the cooling station.

* * * * *